Nov. 6, 1934.  G. SABIK ET AL  1,979,285
DUPLICATING MACHINE
Filed July 25, 1932    11 Sheets-Sheet 2
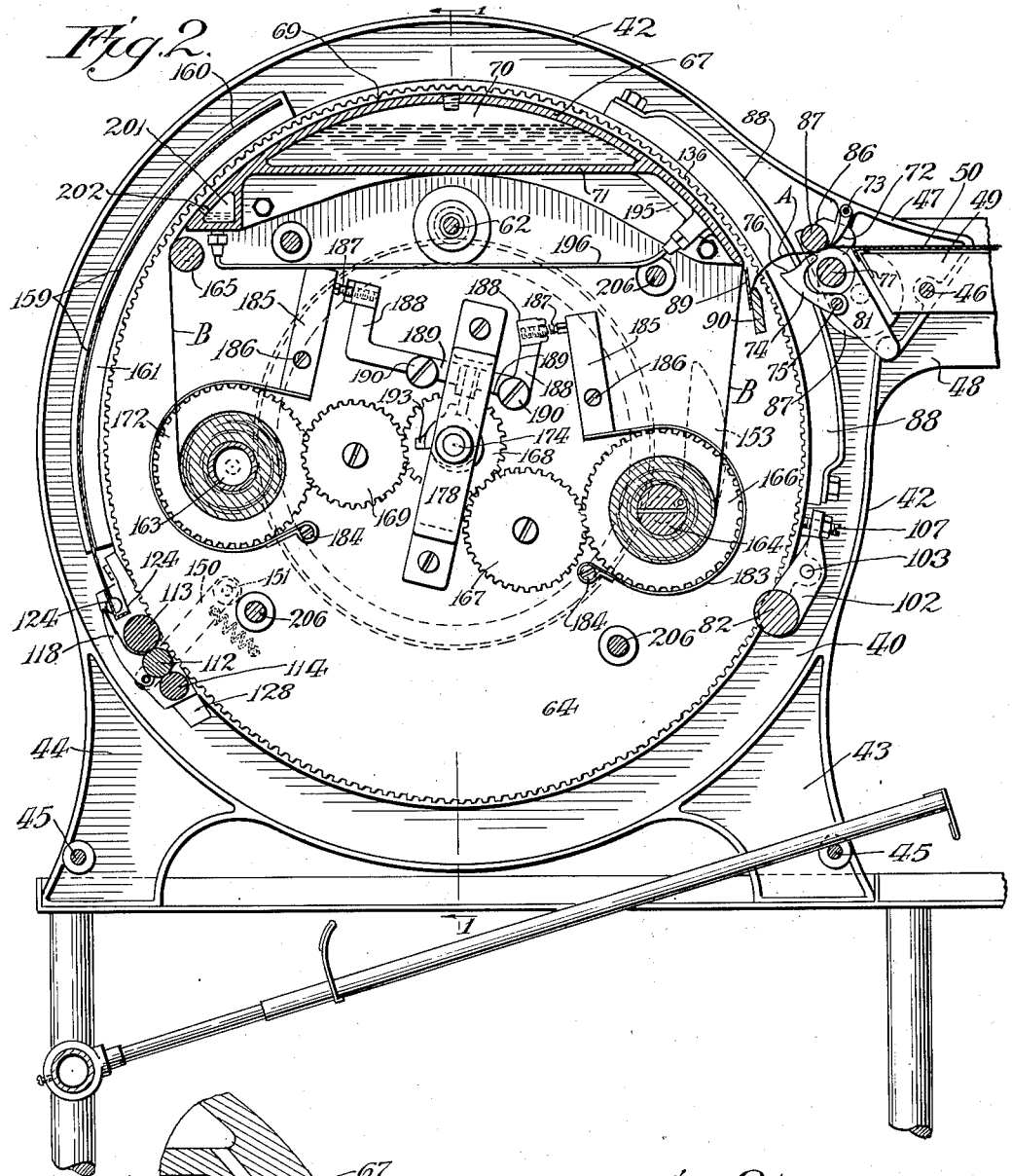
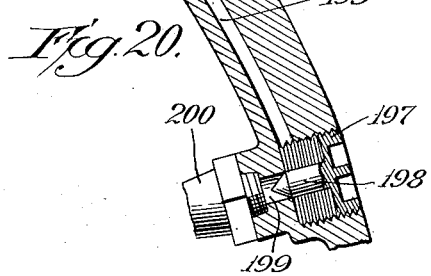
Inventors:
Samuel Offer and
George Sabik Nov. 6, 1934.  G. SABIK ET AL  1,979,285
DUPLICATING MACHINE
Filed July 25, 1932  11 Sheets-Sheet 3

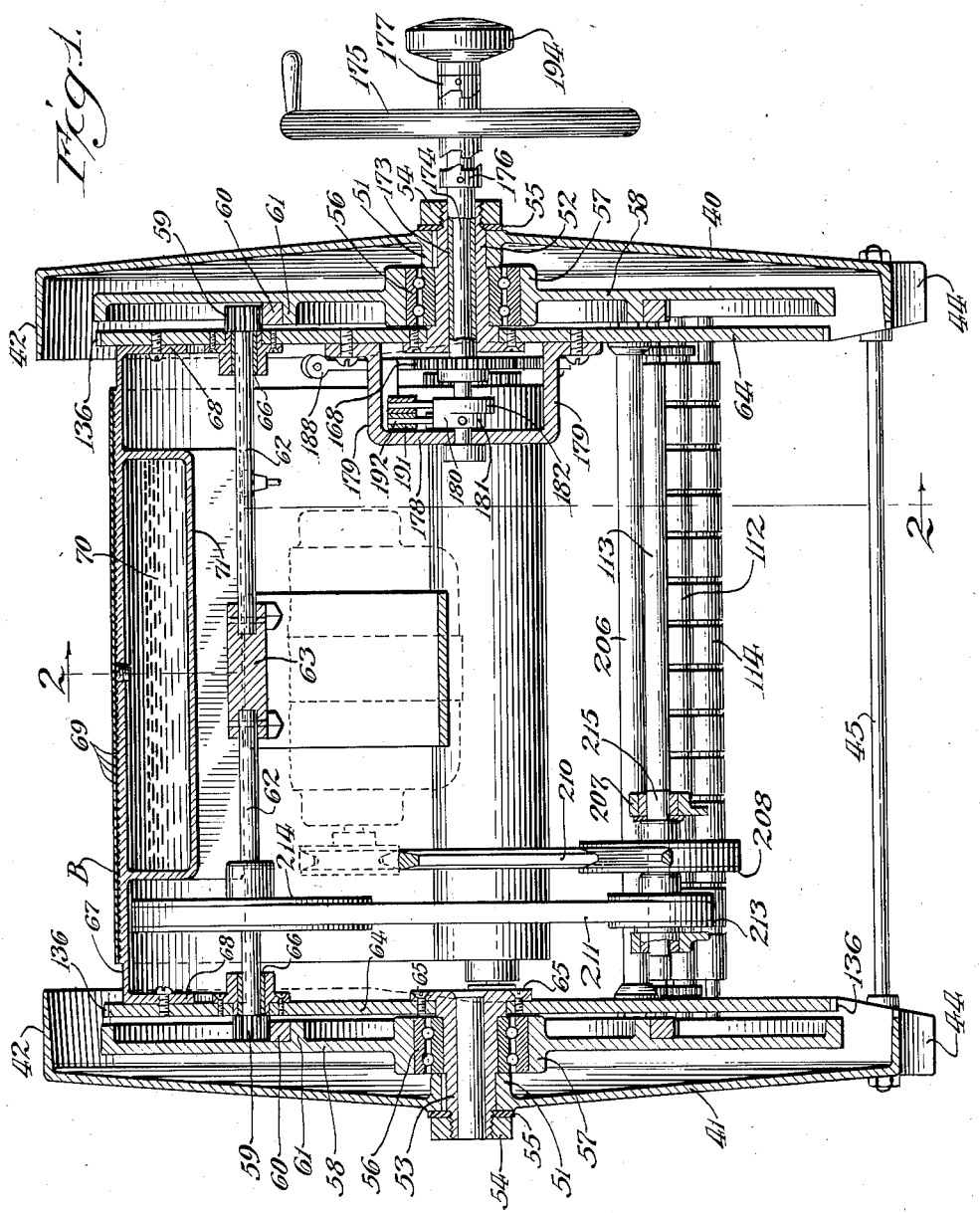

Inventors:
Samuel Offer and
George Sabik
by Banning & Banning
Attys.

Nov. 6, 1934.   G. SABIK ET AL   1,979,285
DUPLICATING MACHINE
Filed July 25, 1932   11 Sheets-Sheet 4

Inventors
Samuel Offer and
George Sabik
by Banning & Banning
Attys.

Nov. 6, 1934.  G. SABIK ET AL  1,979,285
DUPLICATING MACHINE
Filed July 25, 1932  11 Sheets-Sheet 5
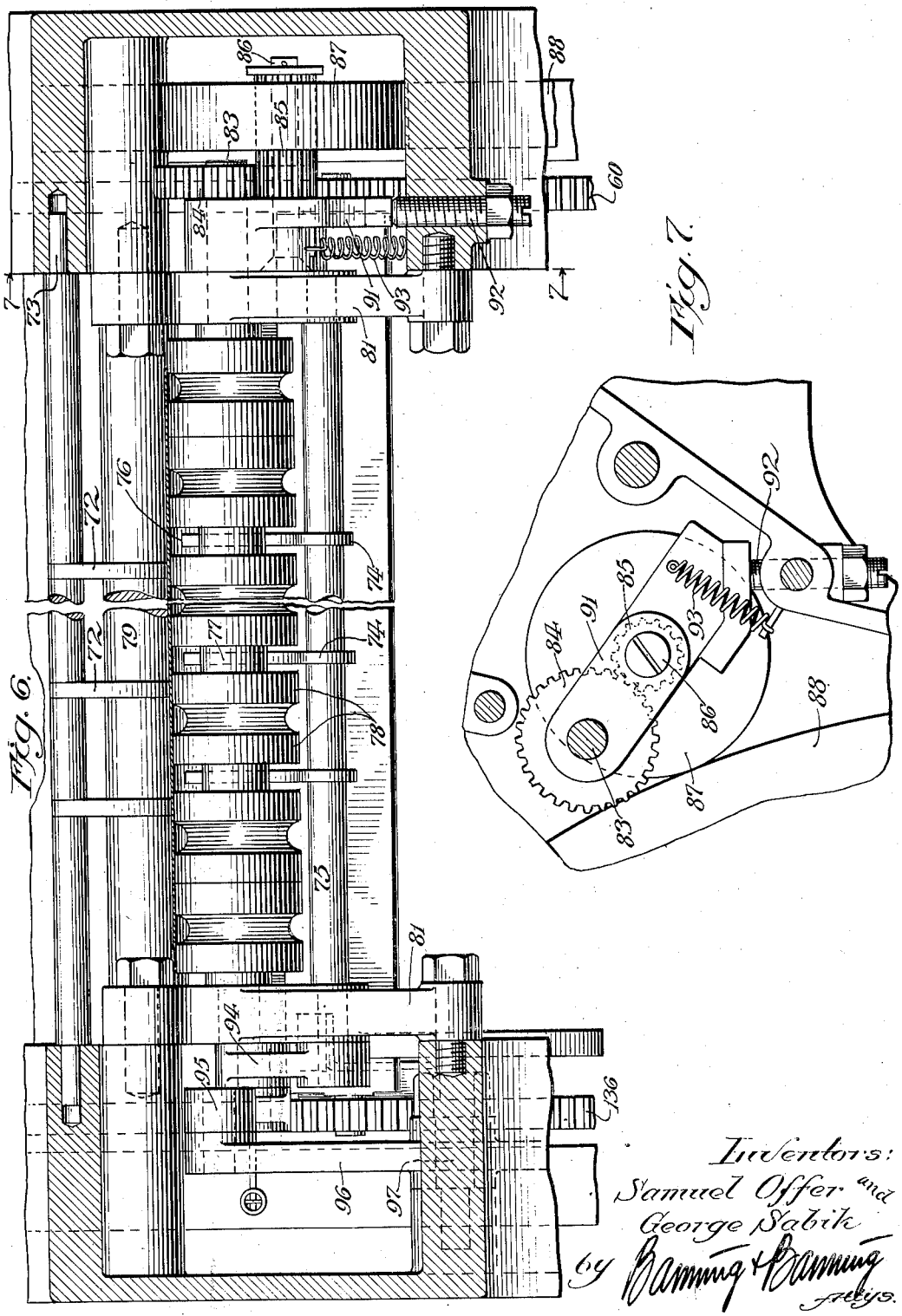

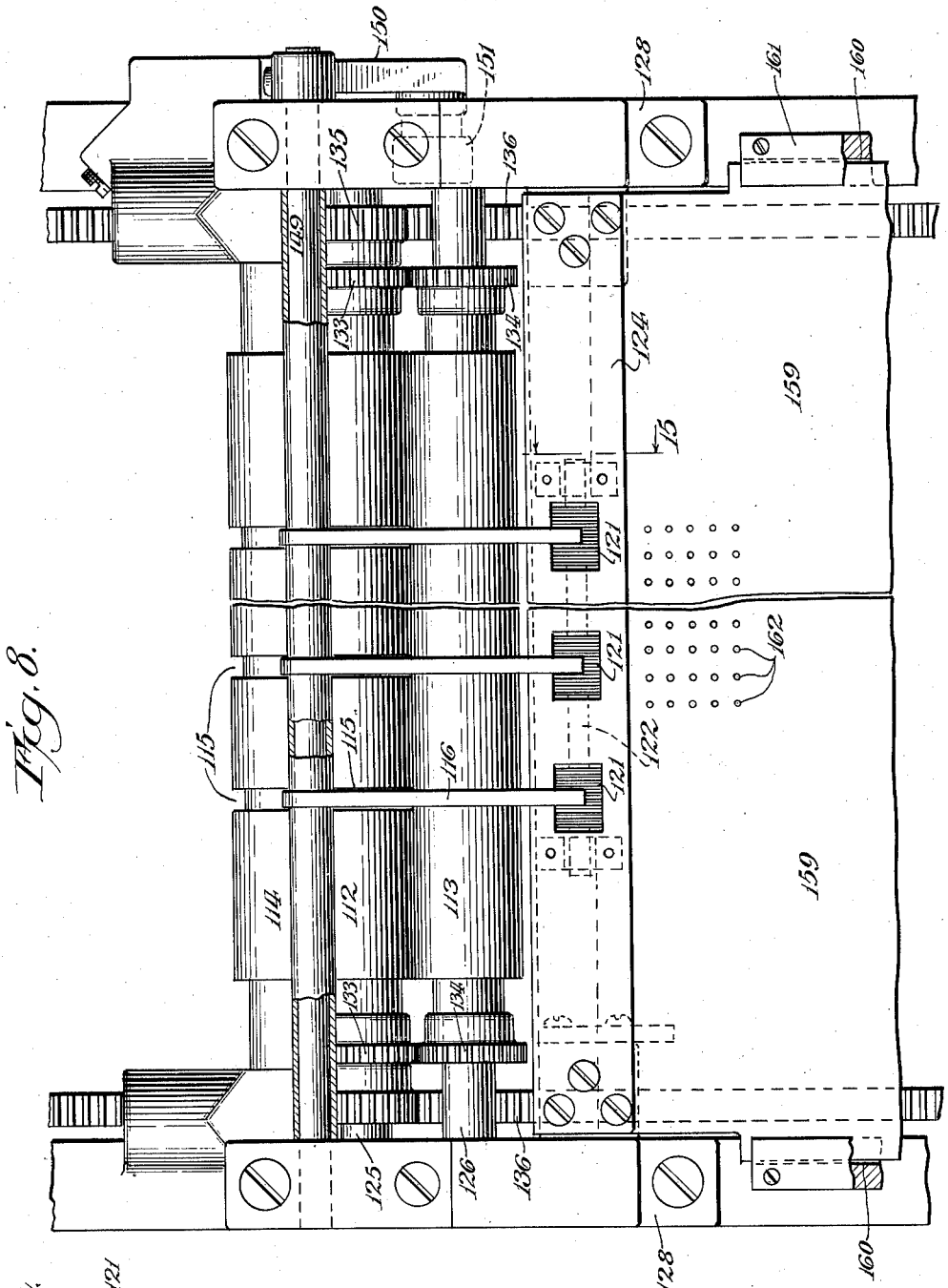

Nov. 6, 1934.                G. SABIK ET AL                1,979,285
                          DUPLICATING MACHINE
                    Filed July 25, 1932       11 Sheets-Sheet 7

Inventors:
Samuel Offer and
George Sabik
by Banning & Banning
Attys.

Nov. 6, 1934.  G. SABIK ET AL  1,979,285
DUPLICATING MACHINE
Filed July 25, 1932   11 Sheets-Sheet 8
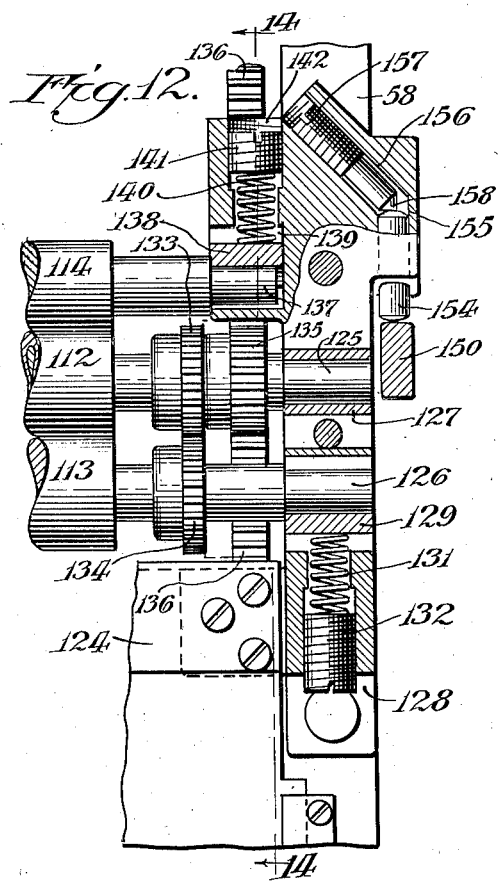
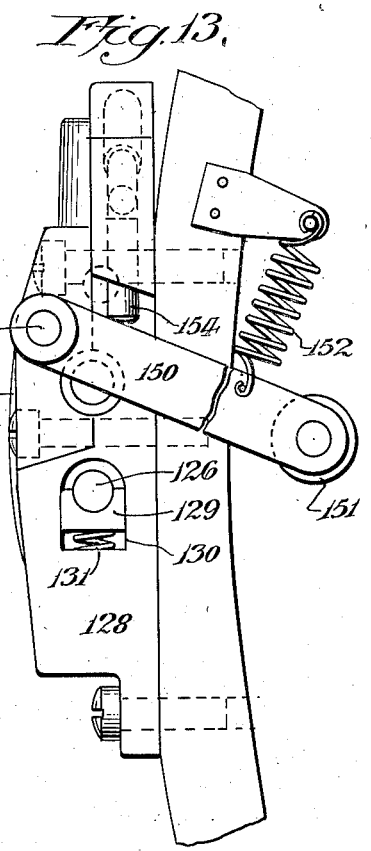
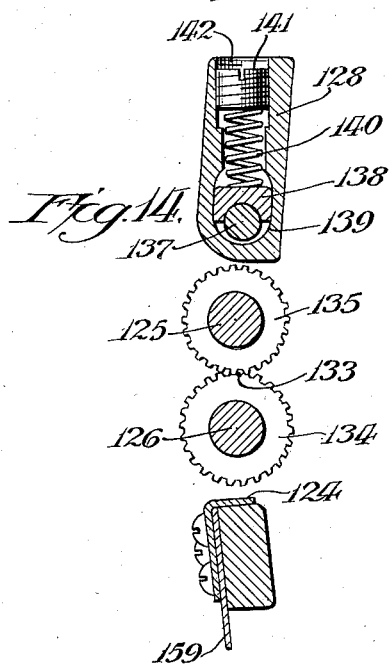
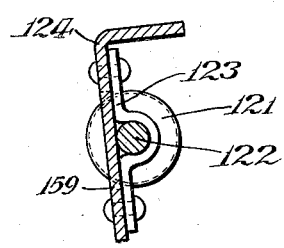
Inventors:
Samuel Offer and
George Sabik
by Banning & Banning
Attys

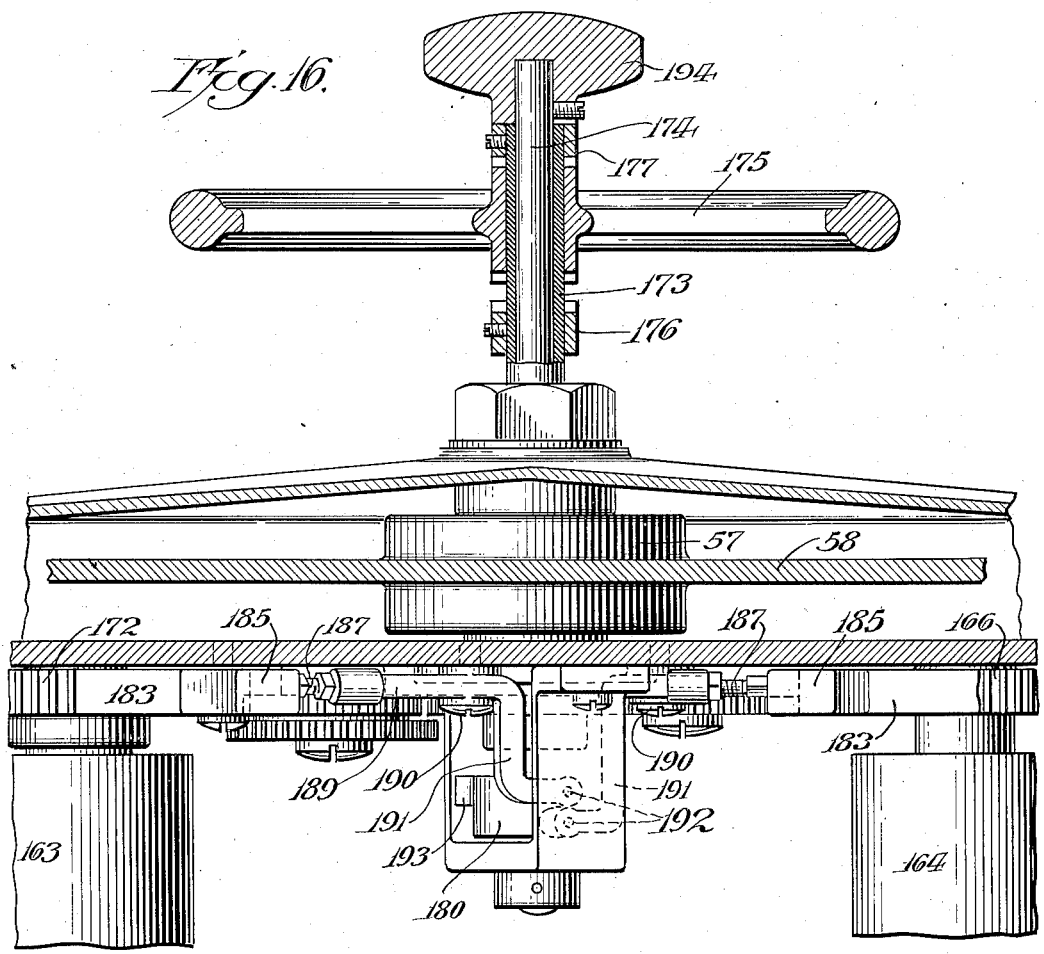
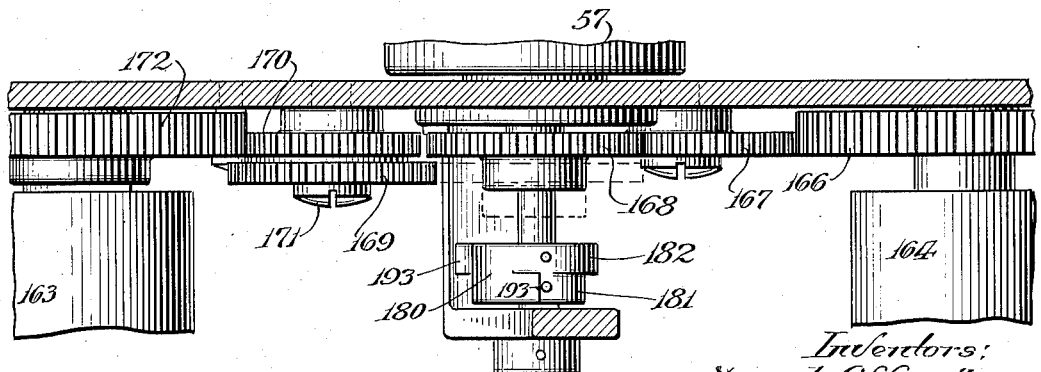

Nov. 6, 1934.    G. SABIK ET AL    1,979,285
DUPLICATING MACHINE
Filed July 25, 1932    11 Sheets-Sheet 10

Inventors:
Samuel Offer and
George Sabik
by Banning & Banning
Attys

Nov. 6, 1934.  G. SABIK ET AL  1,979,285
DUPLICATING MACHINE
Filed July 25, 1932  11 Sheets-Sheet 11
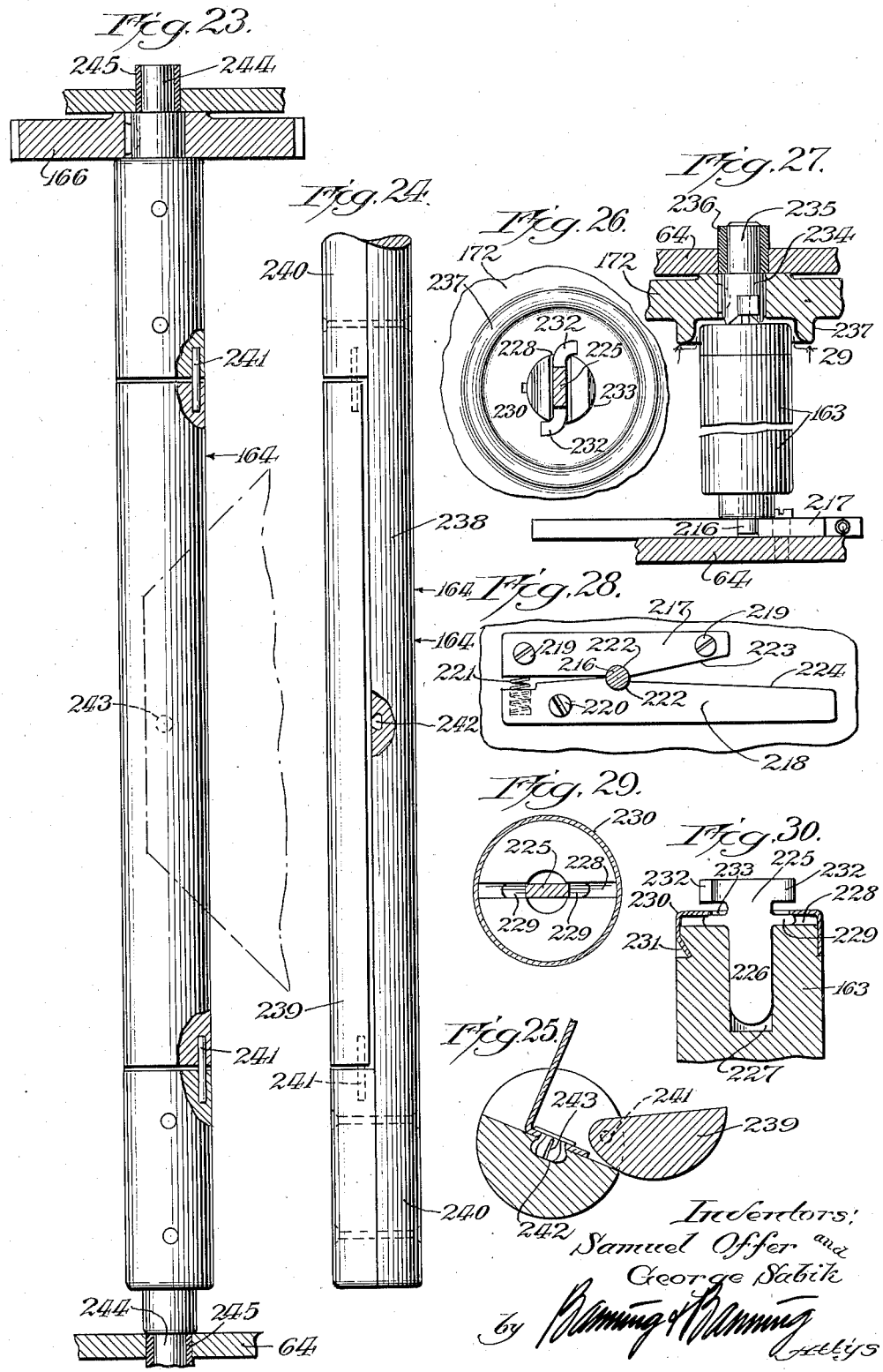

Patented Nov. 6, 1934

1,979,285

UNITED STATES PATENT OFFICE 1,979,285

DUPLICATING MACHINE

George Sabik, Western Springs, and Samuel Offer, Chicago, Ill., assignors to U. S. Duplicator Company, Chicago, Ill., a corporation of Illinois Application July 25, 1932, Serial No. 624,512

27 Claims. (Cl. 101—131)

The machine of the present invention constitutes an improvement and development of the machines set forth and described in the Sabik patent, No. 1,749,160, dated March 4, 1930, and the Sabik and Offer patent, No. 1,833,181, dated November 24, 1931.

The machine of the present invention embodies the basic principles of the patents above referred to, and the improvements are directed to the mechanisms provided for regulating the forward feeding of the paper sheets from a stack with a view of more certainly and positively positioning the paper sheets during the initiatory portion of the feeding operation; to the means provided for insuring a firm and uniform contact of the sheets when first brought into contact with the surface of the gelatine band; to the means provided for smoothly and evenly spreading the sheet upon the gelatine surface; to the means for certainly and uniformly stripping the sheets from the gelatine surface after taking the impression; to the means provided for carrying the sheets forwardly after the stripping operation and depositing them evenly and uniformly in a stack or pile at the discharge end of the machine; to the means for adjusting the apron which carries the imprinted sheets forward to the discharging position; to the winding and delivering spindles for the gelatine band; to the means for moistening the gelatine band during the rewinding operation; to the brake mechanism for permitting the gelatine band to be tightly stretched upon the bed of the machine; and to numerous other features of construction of the individual parts and their general assembly into the machine as a whole.

The machine of the present invention embodies a stationary cylindrical bed plate over which a section of the gelatine strip is drawn to present the master copy from which the impressions are taken. The stationary bed plate co-operates with associated presser and stripper mechanisms, both carried on a rotating carrier adapted to be operated at relatively high speed. The sheets to be imprinted are stacked on a suitable table or platform at the feeding side of the machine and are initially fed forward by hand until brought between the lower roller and the tips of pressure fingers which assist in holding the paper firmly against the lower roll and bringing its edge in the bite between the upper and lower rolls, which intermittently operate to feed the sheets inwardly into position to contact the surface of the gelatine band. Thereafter, the presser roll, in timed relation to the feeding mechanism, acts to overturn the sheet presented by the feeding mechanism, and spread and compress it evenly and uniformly upon the gelatine surface to take the impression. Thereafter, in timed rotation, the stripping mechanism engages the edge of the imprinted sheet and rolls it back from the gelatine surface, and thereafter carries it forward to the discharging position.

In its general principle of operation, the machine of the present invention is similar to the machines described in the patents above referred to, but the mechanisms employed for performing the several operations embody numerous features of modification and improvement which will be described in detail.

In the drawings:

Figure 1 is a sectional elevation through the center of the machine, taken on line 1—1 of Fig. 2 looking toward the rear of the machine;

Fig. 2 is a sectional elevation, taken on line 2—2 of Fig. 1 looking toward the right hand side of the machine;

Fig. 6 is an enlarged sectional detail of the paper feeding mechanism looking forwardly from the interior of the machine;

Fig. 7 is an enlarged detail of the driving train for the paper feeding roll, showing the means for adjusting the elevation of the roll;

Fig. 8 is an enlarged detail looking downwardly upon the stripping mechanism and delivering apron for carrying forward the imprinted sheets;

Fig. 12 is a detail partly in section showing the stripper roll driving train and means for adjusting the stripper roll group;

Fig. 13 is a side elevation of the mountings for the stripper roll group showing the means for lifting the clamping fingers to release the paper sheets;

Fig. 14 is a detail of the parts shown in Fig. 12 taken on line 14—14;

Fig. 15 is a detail of the mounting for the clamping rolls which engage the paper sheet;

Fig. 16 is a detail partly in section showing the brake mechanism for the winding and delivering spindles which carry the gelatine band;

Fig. 17 is a similar mechanism showing the driving train for the respective spindles;

Fig. 20 is a detail of the valve for controlling the supply of moisture imparted to the gelatine band;

Fig. 21 is an end view of the adjustable plug of Fig. 20;

Fig. 22 is an enlarged view of one of the corrugated rolls which coacts with the clamping fingers in gripping the paper sheets during delivery;

Figs. 23 and 24 are details of the winding spindle for the gelatine band;

Fig. 25 is a cross section of the same, showing the spindle opened;

Figs. 26 and 27 are details of the chuck mechanism for the delivery spindle;

Fig. 28 is a detail showing the spring journal mounting for the end of the delivery spindle;

Fig. 29 is a sectional detail on line 29 of Fig. 27; and

Fig. 30 is an enlarged sectional detail of the chuck end of the spindle.

Figure 3:
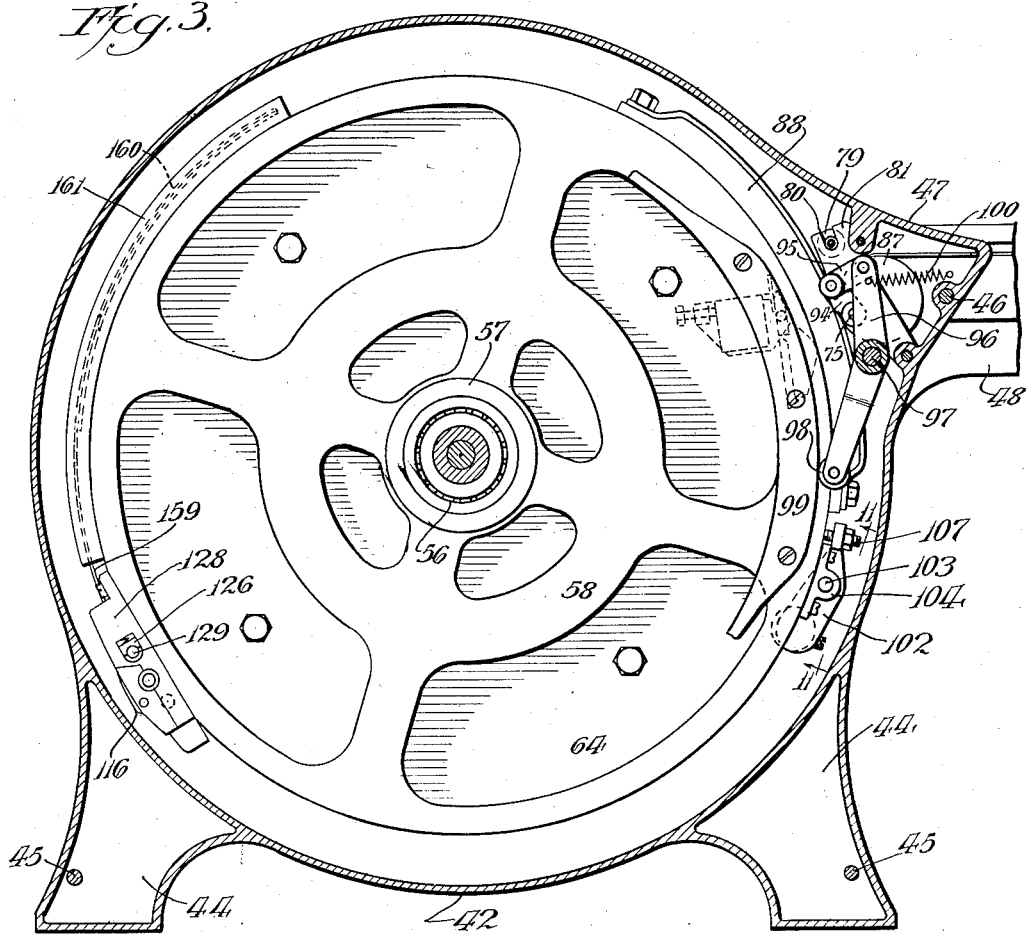
Fig. 3 is an elevation sectioned through the frame of the machine at the extreme left hand side and looking toward the right and showing one of the rotatable carriers for the presser and stripping mechanisms.

The machine as a whole is mounted within a frame consisting of a right hand end circular plate 40 and a left hand end circular plate 41, the terms "right" and "left" referring to the machine as viewed by the operator from the paper feeding position.

Each of the end plates is provided with an inturned peripheral flange 42 which carries depending front and rear legs 43 and 44, the terms "front" and "rear" referring to the position occupied by the operator.

The end plates are tied together by tie rods 45 which extend through the pairs of front and rear legs respectively, and also by the provision of a tie rod 46 which extends through a forwardly protuberant portion 47 of each of the flanges 42.

Each of the end plates, furthermore, is provided with a forward extension 48 which carries a bar 49, which bars one on each side support a table or platform 50 upon which the paper sheets are stacked preparatory to feeding.

Each of the end plates 40, as shown, is of drum head formation, and each is provided in its center with an inturned boss 51, which bosses afford mountings for sleeves 52 and 53 respectively.

Each of the sleeves is rigidly held in position by means of a nut 54 which is screwed onto the threaded end of the sleeve and bears against a washer 55. Each of the sleeves serves as a mounting for a ball race 56 which affords a ball bearing mounting for the hub 57 of a rotatable carrier wheel 58 of open-work formation, as shown in Fig. 3.

The carrier wheels in unison serve to support the presser and stripper rolls and associated parts, and are rotated in unison by the meshing of pinions 59 with ring gears 60 fastened to and carried respectively by inturned flanges 61 on the respective carrier wheels.

The pinions 59 are carried at the outer ends of alined shaft sections 62—62, which are connected by a coupling 63, so that, functionally considered, the shaft sections constitute a single shaft for imparting uniform rotation to the carrier wheels at both sides of the machine.

Inside of each carrier wheel is located a fixed circular plate 64 which is rigidly secured by screws 65 to the flanged inner end of the associated sleeve 52 or 53 as the case may be, so that the inner circular plates stand in fixed relation to the drum head side plates of the frame of the machine and constitute in effect a portion of the fixed framework.

The shaft sections 62 extend through journal bushes 66 in the respective fixed inner plates 64, so that any rotation imparted to the shaft 62 will cause rotation of the carrier wheels.

The bed 67 of the machine is of cylindrically curved formation and occupies the upper section, being provided with side flanges 68 which are screwed to the proximate fixed plates 64, so that the center upper portion of the machine presents a curved surface for the support of a gelatine band B.

The upper surface of the bed plate is preferably corrugated, as indicated at 69 in Fig. 1, to afford a broken or recurrent contact with the under fabric surface of the gelatine band, and below the bed plate and integral therewith is formed a water reservoir 70, which is furnished by a flat partition plate 71 which spans the space from side to side of the curved bed plate. The water reservoir will be described more in detail hereafter.

The platform 50 is positioned to deliver sheets of paper beneath the tips of a row of fingers 72 which are loosely hung or pivoted upon a fixed cross rod 73 supported at its ends within the protuberant forwardly extending portions 47 of the side drum plates of the frame.

The fingers 72 (Figs. 4 and 5), which may be referred to as the upper fingers, are supplemented with a group of lower fingers 74, which stand in closely spaced relation and extend from side to side of the machine, being rigidly mounted upon the rock shaft 75.

Figure 4:
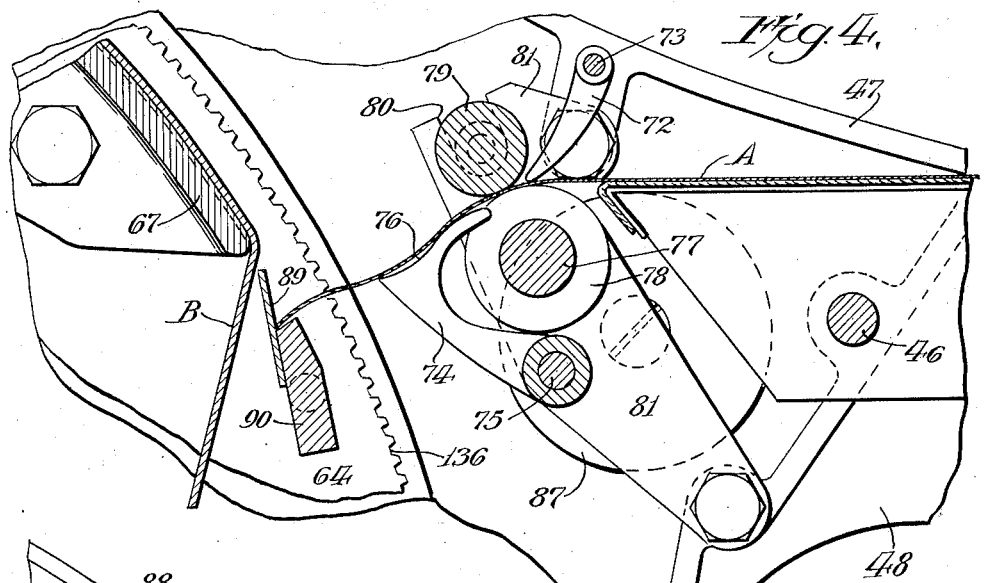
Figs. 4 and 5 are enlarged details showing the feeding platform and associated feeding mechanisms at two different stages in the paper feeding operation.
Figure 5:
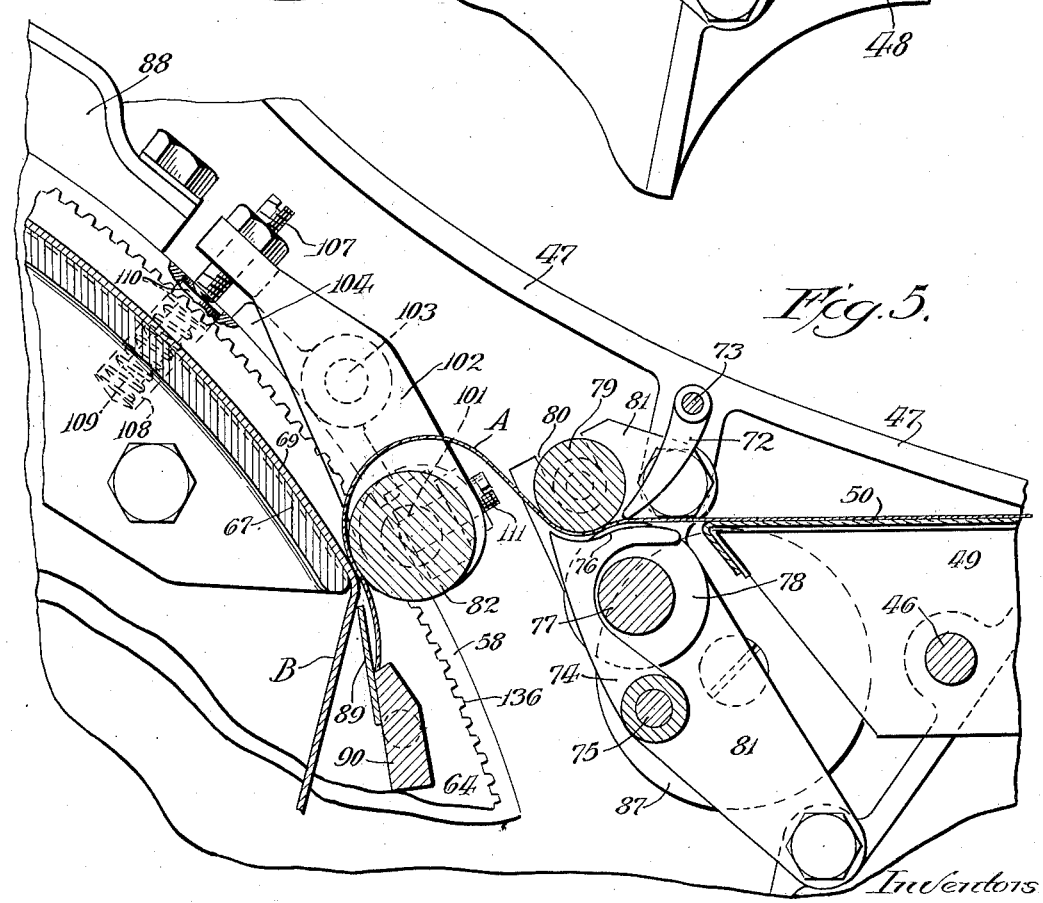

The hooked lower fingers normally stand in the position shown in Fig. 4 to present the upper sides 76 of their tip ends into feeding contact with the paper sheet A, but are adapted to be swung forward into the position shown in Fig. 5 to afford clearance for the passage of the presser roll and stripper rolls.

The upper and lower fingers co-operate with a feed roll 77, the surface of which (see Fig. 6) is afforded by grooved disks 78 of rubber or like material, which disks are suitably spaced from one another to afford a clearance for the upward swing of the lower hooked fingers 74, and at the same time the disk feed roller surface affords frictional contact along the leading edge of the paper sheet from side to side thereof so as to insure uniform feeding of the sheet into the machine.

The lower feed roll 77 co-operates with an upper friction roll 79, the ends of which are reduced and journaled within open journal slots 80 in plates 81 bolted to the fixed frame of the machine at opposite ends of the upper friction roll 79. The feed roll 77 is intermittently power driven to advance the sheets into the machine prior to the arrival of a presser roll 82, the operation of which will be presently described.

The feed roll 77 (see Fig. 6), at its right hand end, terminates in a reduced extension 83 which carries a gear 84 which meshes with a pinion 85 on a stub shaft 86, which shaft carries a rubber or similarly surfaced friction wheel 87 adapted to be recurrently contacted by an arcuate shoe 88 (see Fig. 7) carried by the right hand rotating carrier which outstands from the periphery of the carrier, so that, at the proper point in the cycle of operations, a positive feeding movement will be imparted to the feed roll and the paper will be advanced to the position shown in Fig. 4, at which point the leading edge of the paper will be brought into contact with a margin bar 90 having an upstanding flange 89, (see Figs. 4 and 5) and will occupy the groove or channel afforded in the margin bar, which groove or channel, as shown, is slightly acute in angularity, the edge forming the groove in the margin bar being slightly beveled to cause the edge of the paper to be held in place when it is brought into contact with the margin bar during the feeding operation to insure perfect registration.

In order to adjust the frictional contact between the friction wheel 87 and the shoe 88 (see Fig. 7), the stub shaft 86 is carried by an arm 91, which is loosely journaled on the reduced extension 83 of the feed roll 77, and the free end of the arm is adapted to contact an adjusting screw 92 against which it is held by a coil spring 93, the arrangement being such that by adjusting the screw, the friction wheel can be slightly raised or lowered, without, however, interfering with the meshing of the pinion 85 with the gear wheel 84.

The shaft 75, which carries the lower hooked fingers 74, is recurrently actuated to draw back the fingers into the position shown in Fig. 5, by means of linkage, which is best illustrated in Fig. 3. The shaft near its left hand end (Figs. 3 and 6) carries an arm 94 which has pivoted thereto a link 95, which in turn is pivoted to the upper end of a lever 96 journaled upon a stub 97, and carrying at its lower end a roller 98, which is adapted at the proper time in the cycle of operations to be lifted and ride upon a cam 99 carried by the rotating carrier 58 at the right hand side of the machine.

The shoe 88 and the cam 99 are relatively positioned to cause the rock shaft 75 to be rocked and the hooked fingers withdrawn slightly in advance of the instant of contact of the shoe 88 with the friction roll 87, with the result that the fingers will be swung down into the feeding position indicated in Fig. 4, slightly in advance of the instant when the paper sheet begins to feed forward, so that the leading edge of the paper sheet will ride along and be guided by the upper surfaces 76 of the aligned fingers during the instant of time the paper is being fed forward to bring its leading edge into contact with the margin bar 89, and the paper feeding will continue until the paper has been looped upwardly into the position shown in Fig. 5, which brings it into slightly adherent contact with the gelatine surface prior to the arrival of the presser roll, as indicated in Fig. 5. However, the parts are so related that prior to such arrival the fingers will be drawn back through the action of a spring 100 (Fig. 3) to afford clearance for the passage of the presser roll 82. Thereafter, the continued movement of the presser roll will draw the paper sheet forwardly and overturn it into position to bring it smoothly and evenly against the imprinted surface of the gelatine to receive the impression therefrom.

Figure 11:
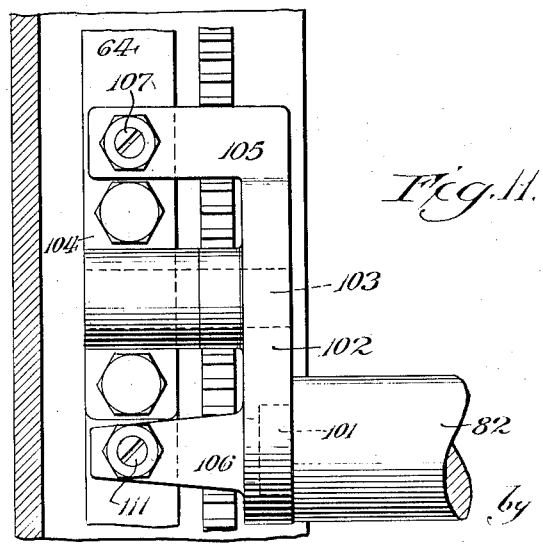
Fig. 11 is a detail showing the method of adjusting the pressure roll, as indicated by line 11—11 of Fig. 3.

The presser roll 82 (Figs. 2, 5 and 11), which is preferably a rubber surfaced roll, has each of its journals 101 mounted in a bracket 102, which in turn is pivoted upon a pintle 103 carried by a journal plate 104 secured to the rim of the proximate carrier wheel, so that the bracket 102 may be tilted or adjusted to vary the pressure of the presser roll.

For purposes of adjustment, each of the tilting brackets 102 is provided at its ends with outwardly turned tongues 105 and 106 respectively. The tongue 105 receives a screw 107, which extends inwardly into a bore 108 to contact a shouldered pin 110 in the rim of the carrier wheel, and the inner end of the pin is surrounded by a coil spring 109 bearing against the shoulder of the pin, for the purpose of exerting an adequate thrust on the end of the tilted bracket to brace the roll 68 inwardly against the surface of the gelatine band B. The extent of this inward thrust upon the roll is regulated by means of an adjusting screw 111 entered through the link 106 in position to bear against the rim of the carrier wheel, which screw thus acts as an adjustable stop to limit the movement of the tilting bracket. This arrangement is duplicated on each side of the machine.

The stripper mechanism (Figs. 2, 8, 9 and 10) comprises companion power driven rolls 112 and 113 and a backing roll 114. The roll 112 occupies the intermediate position and is provided at recurrent intervals with circumferential grooves 115, each of which receives the lower edge of a guiding and clamping finger 116 provided with a wedge-shaped extension 117 inwardly extending to occupy the space intermediate the rolls 112 and 113, the arrangement being such as to bring one edge of the wedge-shaped extension within the proximate groove in the roll 112 and to bring the other edge of the wedge-shaped extension into spaced overlying relation to the roll 113 to provide a guide for the advance of the paper sheet A during the stripping operation. This arrangement positively guides the paper sheet around the roll 113, but prevents it from being turned back around the roll 112, which latter roll occupies the leading position in the rotation of the carrier wheels.

Each of the fingers 116 terminates in a backwardly extending tip portion 118 provided with an underlying thin flat spring 119, the inner end of which is socketed within a slot 120 at the base of the finger tip, and the free outer end of each spring bears against a circumferential corrugated roll 121 freely rotatably mounted upon a pintle 122 carried by straps 123 (Fig. 15), the ends of which are secured to an angle shaped margin plate 124, the ends of which are secured to the carrier wheels by brackets on opposite sides of the machine.

The roll 112 is provided at each end with a reduced journal 125, and the roll 113 is provided at each end with a reduced journal 126 (Fig. 12). The journals 125 are mounted within journal bearings 127 in brackets 128 mounted upon each of the carrier wheels, and the journals 126 are freely mounted within sliding journal boxes 129 guided within slots 130 and acted upon by springs 131 adapted to be adjusted by regulating screws 132, so that the pressure exerted between the rolls can be regulated to accommodate paper of different thicknesses.

The rolls 112 and 113 carry intermeshing pinions 133 and 134 respectively, and the roll 112 also carries a driving pinion 135 which meshes with rack teeth 136 on the periphery of the proximate fixed side plates 64, so that, as the carrier wheels rotate, the driving pinions 135 at opposite ends of the roll 112 will be rotated, and rotation in the opposite direction will also be imparted to the roll 113 through the pinions 133 and 134.

The reinforcing roll 114 acts as a backing or reinforcement for the roll 112 to maintain it against any flexation, and the reinforcing roll has its reduced journal ends 137 mounted within half circular journal boxes 138 movable within slots 139 formed within the inner faces of the brackets 128. Each of the journal boxes 138 is backed by a spring 140, the tension of which may be adjusted by a screw plug 141 threaded into a bore 142, as indicated in Fig. 12. This enables the backing pressure of the roll 114 to be conveniently regulated.

Figure 9:
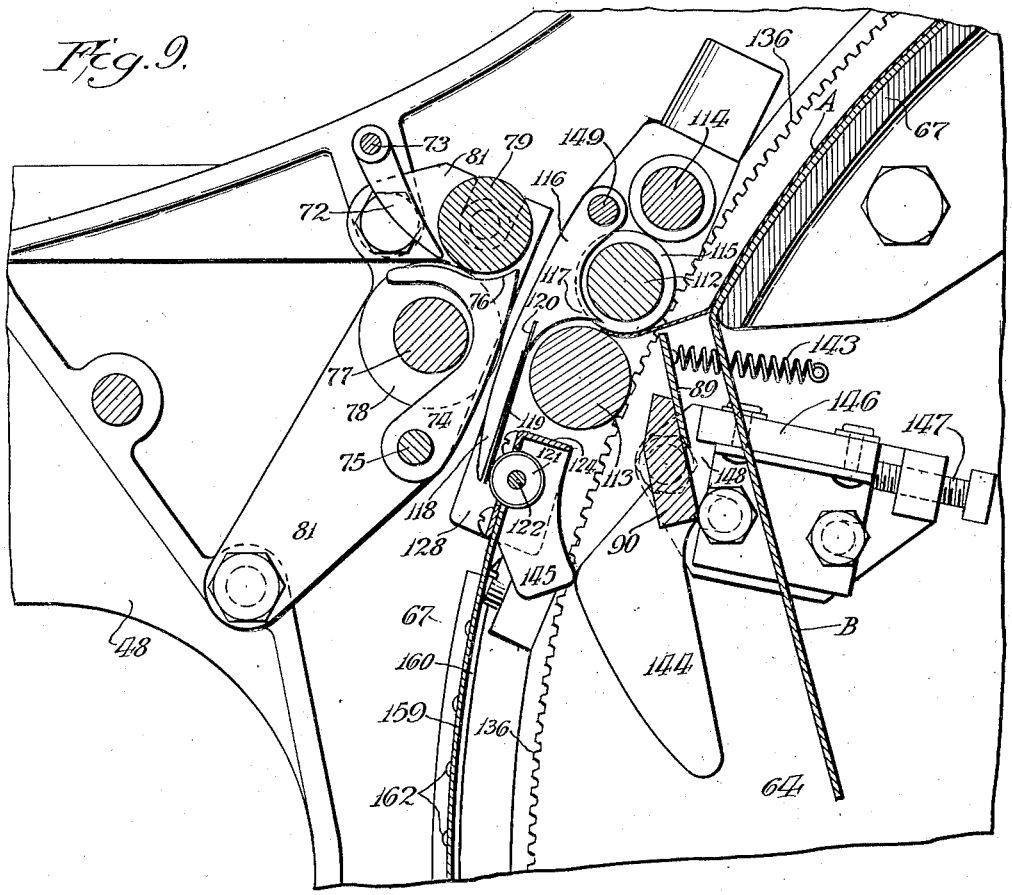
Fig. 9 is an enlarged detail of the stripping mechanism in position to initially begin the stripping operation.
Figure 10:
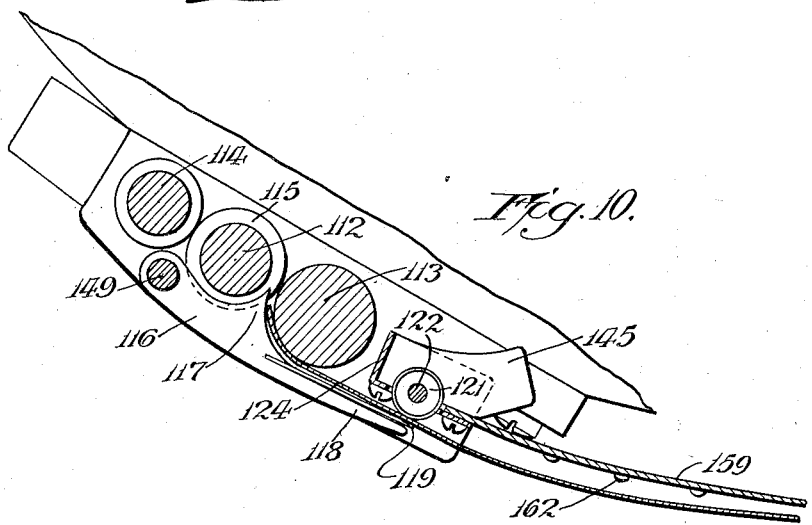
Fig. 10 is a similar view showing the relation of the parts after the stripping operation is completed and while the paper sheet is being carried around to discharging position.

The margin bar 90 affords a stop for the leading edge of the paper sheet when initially fed forward and coacts with the stripper roll group to deliver the same edge of the paper into the bite of the stripping rolls, as indicated in Fig. 9. This edge of the paper, which in the initiatory feeding operation occupied the leading position, occupies the rear position after the paper sheet has been spread upon the gelatine surface, and during the stripping operation is fed through the rolls as the stripping rolls pass over the gelatine surface. The paper sheet is then held between the springs 119 and rolls 121, and carried upon a paper supporting apron.

At the instant the stripper group arrives at a position adjacent the edge of the paper sheet, which projects free of the gelatine band B, the flanged margin bar 90 is actuated to swing outwardly against the tension of a spring 143, which kicks up the edge of the paper into the bite of the rolls 112 and 113.

The margin bar 90 is journalled at its ends within the fixed plate 64, and is provided with a cam finger 144 which is positioned to be engaged at the proper instant by a cam follower 145 carried by the bracket 128 which is secured to the carrier wheels. Immediately after the passage of the cam follower 145, the margin bar will be restored to its normal position by the spring 143 in preparation for the feeding of the next sheet of paper. The return movement of the margin bar is limited by a stop 146 adapted to be adjustable by a screw 147.

The fingers 116 are carried by a rock shaft 149 (Fig. 13), the ends of which are journaled through the journal box in the bracket 128. One end of the rock shaft carries an arm 150 provided at its end with a roller 151 and operating against the tension of the spring 152. The roller 151 coacts with a cam 153 (Fig. 2) secured to the proximate fixed side plate 64 in position to be engaged by the roll at the instant it is desired to unclamp and release the edge of the paper sheet for deposit in a rack beneath the machine, which contact serves to slightly rock the shaft 149 and lift the clamping fingers 116 away from the rolls 121 to release the paper.

The movement of the arm 150 (Figs. 12 and 13) is regulated by the adjustment of a stop pin 154 slidably mounted within a bore 155 in the proximate bracket 128, which bore communicates with an obliquely disposed bore 156, which is threaded to receive an adjusting screw 157, the tapered end 158 of which bears against the inner end of the stop pin in a manner which permits the adjustment of the stop pin to be regulated by the adjustment of the screw.

The angle plate 124 has secured thereto the forward edge of an apron 159, which is in the form of a pair of overlapping cylindrical curved plates (Fig. 2), the edges of which are guided and held within the arcuate grooves 160 in curved guide bars 161 secured respectively to the carrier wheels.

The surface of the apron is preferably provided with spaced bosses or bumps 162, or otherwise configured to present a broken surface for the contact of the paper sheets which are fed backwardly (with respect to the direction of rotation) by the stripper rolls, and the paper sheets thus fed lie upon the apron and are carried around by the gripping action of the fingers 116 until the place of deposit is reached. The apron, being formed of overlapped sections, may be adjusted to present a greater or less surface for the contact of the paper.

The gelatine band B is initially carried by a delivering spool or spindle 163 and is adapted to be wound up upon a winding spool 164. The spindles occupy positions within the interior of the machine (Fig. 2) and are journaled between the fixed inner side plates 64. The gelatine band is carried upwardly over a guide roll 165 and around the curved surface of the bed plate and over the forward edge thereof, and thence downwardly to the winding spindle.

Winding rotation is imparted to the spindle 164 which carries a spur gear 166 meshing with an intermediate spur gear 167, which in turn meshes with a center driving gear 168 (Figs. 2, 16 and 17). The center driving gear is adjustable to unmesh from the intermediate gear 167 and mesh with a gear 169 which is associated with a gear 170 on a stub shaft 171, and the gear 170 in turn meshes with a spur gear 172 which is connected with the spindle 163, so that in unwinding, the driving gear 168 will be in train with the spindle 163 and out of train with the spindle 164.

The driving gear 168 is carried by a tubular shaft 173 (Fig. 1) which is journaled through the sleeve 52 and slidably mounted therein, and surrounds a center shaft 174, and carries a hand wheel 175 on the right hand side of the machine. The tubular shaft 173 carries an inner toothed clutch collar 176 and an outer toothed clutch collar 177, and the clutch collars present the abrupt faces of their teeth in opposite directions.

The hand wheel is slidable upon the tubular shaft to engage either the clutch collar 176 or the clutch collar 177, and when the wheel is brought into engagement with the clutch collar 176, the tubular shaft with the driving gear 168 mounted thereon may be moved inwardly to break train with the gear 167 and to establish train with the gear 169.

The end of the inner shaft 174 is journaled within a bracket 178, the legs 179 of which are secured to the inner face of the right hand inner fixed plate 64. The shaft 174 carries a brake-operating cam 180 provided with cam projections 181—182 (Fig. 17), the former of which controls the braking action of the gear 166 and the latter of which controls the braking action of the gear 172.

Each of the gears is surrounded by a brake band 183 (Fig. 2), one end of which is secured to a pin 184, and the other end of which is secured to a lever 185 fulcrumed upon a pin 186. The free end of the lever in each case is contacted by an adjustable screw 187 carried by the projecting end 188 of a lever 189 pivoted on a pin 190 in position to bring its offset inner end 191 into overlying relation to one of the cam surfaces 181 or 182 as the case may be.

Each of the levers carries an inwardly projecting pin 192, which is positioned to ride upon the associated cam surface, and the two cams are circumferentially offset with respect to one another by a difference of about 90°, and each terminates in an abrupt face or shoulder 193, the arrangement being such that as the shaft 174 is rotated, it will first cause the lever which controls the brake band on the delivering spindle to be set, which permits a further slight degree of reduction to be imparted to the winding spindle in order to take up any slack in the gelatine band, after which a further rotation of the brake-operating shaft will set the brake on the winding spindle to prevent release of the tightened band. This braking action is regulated by a knob 194 on the outer end of the shaft 174.

During the rewinding operation, it is desirable to moisten the gelatine band in preparation for its removal from the machine, and in order to supply the necessary moisture, the reservoir 70 is provided. This reservoir delivers water through a conduit 195 to a pipe 196, the supply of water being regulated by a screw plug 197 carrying a tapered valve stem 198 (Fig. 20) which controls a port 199 leading to a nipple 200 into which the pipe 196 enters. The opposite end of the pipe connects with a discharge trough 201 (Fig. 2) formed on the inner side of the bed plate 67 near the rear edge thereof, which discharge trough communicates with a line of discharge apertures 202 along the edge of the bed plate, for the purpose of discharging water in regulated quantities for the purpose of moistening the end of fabric surfaces of the gelatine band as the same is rewound on the spindle 163. As the gelatine band is thus unwound, the moisture deposited on the fabric side of the gelatine will be communicated to the gelatine surface and will tend to keep the same in a soft and pliable condition.

Figure 18:
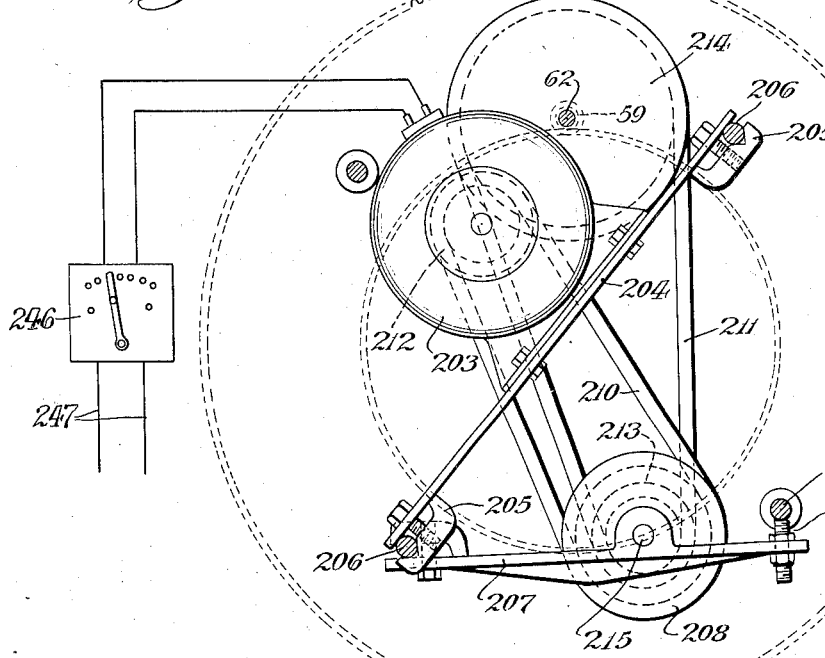
Figs. 18 and 19 are details showing the means for mounting the motor and associated driving mechanisms.
Figure 19:
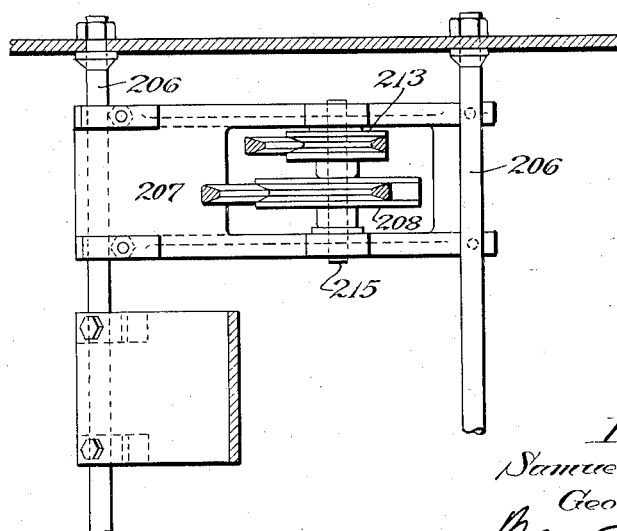

As shown, the rotating carriers are driven from a motor 203 (Fig. 18) which is carried by an obliquely disposed plate 204, the ends of which are secured by clips 205 to upper and lower tie bars 206 which serve to reinforce and tie together the inner side plates 64. The lowermost tie rod also serves to sustain one end of a plate 207 carrying a tension pulley 208, and the opposite end of the plate 207 is provided with an adjusting screw 209 which bears against the adjacent tie rod, thereby permitting the tension of transmission belts 210 and 211 to be regulated.

As shown, the belt 210 surrounds a motor drive pulley 212, and the belt 211 serves to transmit motion from a pulley 213 to a pulley 214, on the shaft 62 which carries the pinion 59. The pulleys 208 and 213 are both mounted on a shaft 215 which is journaled on the tension plate 207.

The delivering and winding spindles for the gelatine band are of special construction, which will now be described in detail. These features of the invention are shown in Figs. 23 to 30 inclusive.

The delivering spindle 163 is provided at one end with a reduced journal pin 216 adapted to be slipped into position and journaled between fixed and movable journal plates 217 and 218 respectively, the former of which is secured by screws 219 to the proximate inner fixed plate 64. The movable journal plate is in the form of a lever which is fulcrumed on a pin 220, one end of which is acted upon by a coil spring 221 which tends to force the proximate ends of the fixed and movable plates apart. Each of the plates on the opposite side of the fulcrum 220 is provided with a half journal groove 222, which journal grooves in unison serve to mount the journal pin 216. The opposed faces 223 and 224 of the fixed and movable plates respectively diverge from one another to afford an easy entrance for the journal pin, which may be slipped into place between the journal plates by a sidewise movement, the movable journal plate yielding to permit such entrance and thereafter snapping back to position to partially encircle the journal pin and furnish a bearing therefor.

The opposite end of the spindle 163 is provided with a chuck member 225, which is preferably formed of a flat plate stamped to afford a shank 226, which is driven into a bore 227 in the end of the spindle, which is preferably made of wood. The spindle is provided with a cross groove 228 which receives the laterally projecting fingers 229 on the chuck member, and a flanged cup shaped ferrule 230 serves to hold the parts in assembled relation. The edge of the cylindrical portion of the ferrule surrounding the end of the spindle is indented at 231 to clamp the spindle and prevent removal. The outer end of the chuck member is provided with outwardly extending reversely bent wings 232 which give to the end of the chuck member the S-shaped configuration shown in Fig. 26. The flat end of the ferrule is provided with a center aperture 233 of sufficient size to permit the chuck member to be inserted through the ferrule in advance of fitting it upon the end of the spindle.

The projecting end of the chuck member is adapted to be engaged by a chuck collar 234 formed in the hub of the gear 172, which gear is provided with a journal stud 235 mounted within a bushing 236 carried by the adjacent inner plate 64. In order to facilitate manipulation of the spindle 163, the inner face of the gear wheel 172 surrounding the chuck collar 234 is provided with an annular flange 237 which affords a socket for centering the end of the spindle and bringing the chuck members into engaging relation.

The winding spindle which forms the permanently positioned portion of the machine (Figs. 23-25) comprises a body portion 238 and a wing portion 239. The body portion, at its ends 240, is of full cylindrical contour, and throughout its medial portion is of half cylindrical contour to afford a recess for the reception of the wing portion 239 which is of half cylindrical contour, so that when closed, as in Fig. 24, the spindle will be cylindrical throughout.

The wing portion, at its ends, is pivoted on pintles 241, so positioned as to permit the wing portion to swing outwardly from the center recessed body portion, as indicated in Fig. 25, thus constituting a gate for exposing the flat face of the half cylindrical body portion of the spindle. Said face is provided at its center with an undercut recess 242 of a size to receive a snap fastener 243 of the character commonly employed as a glove fastener, which fastener is entered through the reduced or tapered end of the gelatine band and permits the same to be easily and conveniently snapped into place against the flat surface of the spindle. Thereafter, as the spindle is wound, the first convolution of the gelatine band will swing back the wing portion of the spindle into close relation, so that thereafter a full cylindrical firm surface will be presented for the support of succeeding convolutions of the band.

The winding spindle, at its ends, is provided with journals 244 which are mounted within bushings 245 in the proximate inner side plate 64, and one end of the spindle carries the spur gear 166.

A copy which has been transferred to the gelatine plate will print a large number of copies therefrom, but each print will be progressively less distinct until finally the gelatine plate will no longer make an impression upon a sheet. It is found in practice that by running the machine at a slower speed as progressive prints are made from the band, the impressions taken therefrom will approach uniformity in depth and clearness of print. To accomplish this change of speed, the device may be equipped with a motor speed reducer, such for example as a rheostat or variable resistance unit 246 which is interposed in the electric lines 247 which connect to the motor 203. After a predetermined number of prints have been made for the band, the operator may adjust the unit 246 to slightly decrease the speed of the motor for another predetermined number of prints, whereupon the speed is again decreased. Obviously, other means for reducing the speed of the machine may be used which are manually operated or automatic in their operation.

*Operation*

In operation, the attendant faces the machine in convenient position to manipulate the paper sheets stacked up on the feeding platform 50. The feeding proceeds from the top of the stack, each sheet being fed forwardly until its leading edge underlies the freely mounted fingers 72. At the proper stage in the rotation of the carrier, the shoe 88 engages the friction wheel 87, and through the train of gears operates the lower grooved feed roller 77, which co-operates with the fingers and upper roll to exert a feeding contact on the paper sheet from side to side thereof, thus insuring uniform advance in the paper toward the margin bar.

After the forward edge contacts the margin bar, the feeding continues for a short time, causing the edge to flex downwardly into the groove or channel in the margin bar, and thereafter continues until the paper is bowed or flexed sufficiently to bring it into facewise contact with the marginal surface of the gelatine band along the edge of the bed plate. This causes a slight adherence of the paper to the gelatine, which is highly desirable in order to insure a firm positioning of the paper prior to the arrival of the presser roller.

With the paper thus flexed, the presser roller advances and rolls out and overturns the paper sheet onto the cylindrical surface of the gelatine roll to secure the impression. Thereafter, the stripper roll assembly is advancing during this interval, and at the instant the stripper rolls arrive in proximity to the outstanding edge of the paper sheet, the margin bar is swung outwardly, which causes the paper sheet to enter the converging groove between the stripper rolls, which are rotating inwardly to roll in the paper sheet as it is advancing, so that with the continued advancement of the rolls thereafter, the paper sheet will be stripped from the gelatine and fed through under the clamping fingers and over the apron, until it leaves the bite of the rolls, after which it will remain clamped by the fingers and carried around with the carrier to the under side of the machine, at which point the fingers will release the paper sheet and allow it to fall.

The arrangement of the hooked feeding fingers 74 is such as to afford a properly configured surface for the forward edge of the paper to insure its proper advancement to the margin bar, after which the fingers cease momentarily to function and are thrown back into grooves in the feed rolls 77 before the arrival of the presser roll and stripper rolls, so that clearance is afforded for the passage of the operating portions of the mechanism.

The configuration of the clamping fingers 116, and the insertion of their edges within the grooves in the stripper roll 112, eliminates any possibility of the paper being drawn around the roll, and insures its rearward travel around the roll 113 and beneath the spring tips of the fingers and onto the apron, which may be adjusted to afford the surface required in carrying the sheets to the place of deposit.

When it is desired to feed forward the gelatine band, in order to expose a new section thereof upon the bed plate of the machine, the brake mechanism is released by the turning of the knob 194 to present the low sections of both of the cams to the brake operating lever arms, which releases both of the brakes, after which the hand wheel 175 may be thrown in clutch to impart rotation to the winding spindle 164. After the required length of gelatine band has been wound up, the brakes will be set on the delivering spindle, and thereafter the winding spindle will be slightly turned to take up all of the slack in the gelatine band and stretch it tightly over the surface of the bed plate, and thereafter the brake will be set on the winding spindle to prevent retraction or loosening of the gelatine band.

When it is desired to rewind the gelatine band, the driving train will be clutched for reverse movement, and a supply of water will be admitted to the trough beneath the gelatine band and discharged through the apertures to moisten the band during the rewinding operation. The removal of the gelatine roll after rewinding is easily effected by merely pulling back the journaled end of the spindle to spring back the journal plate 218, after which the chuck members at the opposite end of the spindle will readily release from one another and permit the spindle to be withdrawn from the interior of the machine.

The hooking of the free end of the gelatine band onto the winding spindle is very easily effected by merely exerting the necessary pressure to snap the fastener into the socket in the body portion of the spindle, while the wing portion hangs back in open position, after which the rotation of the spindle in winding up the gelatine band will automatically close the wing section, so that a complete cylindrical winding surface is thereafter afforded. In rewinding the gelatine band, the snap fastener on the end of the band will automatically release itself from the snap 242 as soon as a rewinding tension is exerted, and the hinged wing portion of the spindle will automatically open up to free the end of the gelatine band without manual attention.

The construction of the device as a whole is relatively simple and compact, and the arrangement is one which permits the machine to be operated by power from within and at a very rapid rate of speed, since the paper sheets are under full and constant control at all times, so that there is no danger of over-feeding or displacement irrespective of the speed at which the machine is operated.

Although the invention has been described with particularity as to detail, it is not the intention unless otherwise specified in the claims to limit the invention to the specific features of construction shown, since variations thereof may be made without departing from the spirit of the invention.

We claim:

1. In a duplicating machine, the combination of a frame provided with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, means actuated by the movement of the carrier for intermittently rotating the feed roll to advance a paper sheet to the bed plate prior to the arrival of the presser member, a row of fingers presenting their tips toward the feed roll and adapted in conjunction therewith to position the edge of the paper sheet in position to be fed forwardly by the rotation of the feed roll, and guide members intermediate the feed roll and the bed plate and mounted in position to underlie and guide the leading edge of the paper when fed inwardly by the feed roll, and means for retracting said guide members away from the bed plate to afford clearance for the passage of the presser member.

2. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, and means actuated by the carrier for intermittently rotating said roller feeding means to inwardly feed the paper in advance of the arrival of the presser member, said roller actuating means including a shoe on the carrier, and a friction wheel adapted to contact therewith and be rotated thereby.

3. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, guiding fingers normally presenting their upper guiding edges in inwardly extended alignment with the feeding plane of the paper through the roller means, a mounting for said guiding fingers, adapted when actuated to swing the fingers inwardly toward the roller feeding means to afford clearance for the passage of the presser member, and means carried by the carrier for actuating the movements of said mounting.

4. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, said roller actuating means including a shoe on the carrier, and a friction wheel adapted to contact therewith and be rotated thereby, guiding fingers normally presenting their upper guiding edges in inwardly extended alignment with the feeding plane of the paper through the roller means, a mounting for said guiding fingers, adapted when actuated to swing the finger inwardly toward the roller feeding means to afford clearance for the passage of the presser member, and means carried by the carrier for actuating the movements of said mounting.

5. In a duplicating machine, the combination of a frame provided with a cylindrically curved bed plate, adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, guiding fingers normally presenting their upper guiding edges in inwardly extended alignment with the feeding plane of the paper through the roller means, a mounting for said guiding fingers, adapted when actuated to swing the fingers inwardly toward the roller feeding means to afford clearance for the passage of the presser member, and means carried by the carrier for actuating the movements of said mounting, said means including a shoe carried by the carrier, and a member positioned to have movement imparted to it when contacted by said shoe.

6. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, said roller actuating means including a shoe on the carrier, and a friction wheel adapted to contact therewith and be rotated thereby, guiding fingers normally presenting their upper guiding edges in inwardly extended alignment with the feeding plane of the paper through the roller means, a mounting for said guiding fingers, adapted when actuated to swing the finger inwardly toward the roller feeding means to afford clearance for the passage of the presser member, and means carried by the carrier for actuating the movements of said mounting, said means including a shoe carried by the carrier, and a member positioned to have movement imparted to it when contacted by said shoe.

7. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the surface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, guiding fingers normally presenting their upper guiding edges in inwardly extended alignment with the feeding plane of the paper through the roller means, a rock shaft on which said guiding fingers are mounted, a shoe carried by the carrier, and a lever arm positioned to be contacted and moved by said shoe and elongated between said lever and said rock shaft for rocking the shaft to retract the guiding fingers prior to the arrival of the presser member.

8. In a duplicating machine, the combination of a frame provided with a cylindrically curved bed plate adapted to support a gelatine band, a rotating carrier having its axis of rotation concentric with the center of curvature of said bed plate, a presser member carried by said carrier and adapted to spread a paper sheet evenly upon the suface of the gelatine band, roller means located in proximate relation to the bed plate and adapted to feed paper sheets inwardly toward the bed plate in position to be engaged by the presser member, means actuated by the carrier for intermittently rotating said roller feeding means to inwardly feed the paper in advance of the arrival of the presser member, said roller actuating means including a shoe on the carrier, and a friction wheel adapted to contact therewith and be rotated thereby, guiding fingers normally presenting their upper guiding edges in inwardly extended alignment with the feeding plane of the paper through the roller means, a rock shaft on which said guiding fingers are mounted, a shoe carried by the carrier, and a lever arm positioned to be contacted and moved by said shoe and elongated between said lever and said rock shaft for rocking the shaft to retract the guiding fingers prior to the arrival of the presser member.

9. In a duplicating machine, the combination of a frame provided with a bed plate adapted to support a gelatine band, a carrier adapted to traverse the bed plate, a presser roll carried by said carrier and adapted to engage and spread a sheet of paper evenly over the surface of said gelatine band, journal brackets for journaling the ends of said presser roll, means for tiltably mounting said journal brackets, a spring for each of said brackets for exerting pressure thereon to force the presser roll inwardly toward the bed plate, and adjustable stop means for each bracket for limiting the inward swinging movement of the tilting brackets.

10. In a duplicating machine, the combination of a frame provided with a bed plate adapted to support a gelatine band, a carrier adapted to traverse the bed plate, a presser roll carried by said carrier and adapted to spread a sheet of paper evenly upon the surface of said gelatine band, a pair of journal brackets tiltably mounted one at each end of the presser roll, a journal mounting for the presser roll at one end of each of the tiltably mounted brackets, and a spring for the other end of each bracket for exerting an outward thrust thereon to tilt the brackets inwardly and cause the roll to exert pressure against the bed plae.

11. In a duplicating machine, the combination of a frame provided with a bed plate adapted to support a gelatine band, a carrier adapted to traverse the bed plate, stripping means carried by said carrier and including a pair of stripping rolls in proximate relation to one another, means for rotating said rolls in opposite directions, to strip away a paper sheet from the gelatine band, one of said rolls being grooved, a group of clamping fingers, each being configured to provide an inwardly extending protuberant portion occupying the convergent space between the rolls, and with a portion of its edge entered into the proximate groove in the grooved roll and with a portion of its edge overlying the companion roll to afford a space for the delivery of the paper sheets, each of the fingers terminating in a rearwardly extending tip adapted to clamp the paper sheets delivered rearwardly by the action of the rolls, a rock shaft upon which the clamping fingers are carried, and means for actuating the rock shaft to lift the tips of the fingers to release paper sheets at the point of delivery.

12. In a duplicating machine, the combination of a frame provided with a bed plate adapted to support a gelatine band, a carrier adapted to traverse the bed plate, stripping means carried by said carrier and including a pair of stripping rolls in proximate relation to one another, means for rotating said rolls in opposite directions, to strip away a paper sheet from the gelatine band, one of said rolls being grooved, a group of clamping fingers, each being configured to provide an inwardly extending protuberant portion occupying the convergent space between the rolls, and with a portion of its edge entered into the proximate groove in the grooved roll and with a portion of its edge overlying the companion roll to afford a space for the delivery of the paper sheets, each of the fingers terminating in a rearwardly extending tip adapted to clamp the paper sheets delivered rearwardly by the action of the rolls, a rock shaft upon which the clamping fingers are carried, means for actuating the rock shaft to lift the tips of the fingers to release the paper sheets at the point of delivery, each of the finger tips being faced with a spring adapted to contact the outer surface of the paper sheets, and a roller underlying each of the finger tips for contacting the under surface of the paper sheets.

13. In a duplicating machine, the combination of a frame provided with a bed plate adapted to support a gelatine band, a carrier adapted to traverse the bed plate, stripping means carried by said carrier and including a pair of stripping rolls in proximate relation to one another, means for rotating said rolls in opposite directions, to strip away a paper sheet from the gelatine band, one of said rolls being grooved, a group of clamping fingers, each being configured to provide an inwardly extending protuberant portion occupying the convergent space between the rolls, and with a portion of its edge entered into the proximate groove in the grooved roll and with a portion of its edge overlying the companion roll to afford a space for the delivery of the paper sheets, each of the fingers terminating in a rearwardly extending tip adapted to clamp the paper sheets delivered rearwardly by the action of the rolls, a rock shaft upon which the clamping fingers are carried, and means for actuating the rock shaft to lift the tips of the fingers to release paper sheets at the point of delivery, and an apron carried by the carrier and extending rearwardly from the stripping mechanism, said apron being extensible to accommodate sheets of different sizes.

14. In a duplicating machine, the combination of a frame provided with a bed plate adapted to support a gelatine band, a carrier adapted to traverse the bed plate, stripping means carried by said carrier and including a pair of stripping rolls in proximate relation to one another, means for rotating said rolls in opposite directions to strip away a paper sheet from the gelatine band, one of said rolls being grooved, a group of clamping fingers, each being configured to provide an inwardly extending protuberant portion occupying the convergent space between the rolls, and with a portion of its edge entered into the proximate groove in the grooved roll and with a portion of its edge overlying the companion roll to afford a space for the delivery of the paper sheets, each of the fingers terminating in a rearwardly extending tip adapted to clamp the paper sheets delivered rearwardly by the action of the rolls, a rock shaft upon which the clamping fingers are carried, means for actuating the rock shaft to lift the tips of the fingers to release the paper sheets at the point of delivery, each of the finger tips being faced with a spring adapted to contact the outer surface of the paper, and a roller underlying each of the finger tips for contacting the under surface of the paper sheets, and an apron carried by the carrier and extending rearwardly from the stripping mechanism, said apron being extensible to accommodate sheets of different sizes.

15. In a duplicating machine, the combination of a frame provided with a circularly curved bed plate adapted to support a gelatine band, a rotating carrier having its axis of rotation concentric with the curvature of said bed plate and comprising spaced wheels located on opposite sides of the machine, a presser member carried by the carrier and adapted to press down paper sheets into contact with the gelatine band, means for stripping said paper sheets from said gelatine band after printing, and an apron carried by the carrier and extending rearwardly behind the stripping means and comprising overlapping cylindrically curved apron sections having their edges engaged by the carrier, and the rearmost plate having its edges slidably mounted within the carrier and adapted to be rotatably adjusted to vary the surface area of the apron.

16. In a duplicating machine, the combination of a bed plate, stripper mechanism comprising a group of two coacting stripper rolls, and a back roll contacting one of the stripper rolls to reinforce the same, intermeshing gears for rotating the stripper rolls in unison, and means for imparting rotation to one of said rolls, spring-backed journal mountings for one of the stripper rolls, and spring-backed journal mountings for the backing roll.

17. In a duplicating machine, the combination of a bed, plate, stripper mechanism comprising a group of two coacting stripper rolls, and a back roll contacting one of the stripper rolls to reinforce the same, intermeshing gears for rotating the stripper rolls in unison, and means for imparting rotation to one of said rolls, spring-backed journal mountings for one of the stripper rolls, and spring-backed journal mountings for the backing roll, and adjustable means for each of said mountings for regulating the spring pressure exerted thereon.

18. In a duplicating machine, the combination of a bed plate adapted to support a gelatine band, means for winding the gelatine band to draw the same across the surface of the bed plate, and means for discharging liquid to the under side of the gelatine band when spread upon the bed plate for moistening the band, said means including a row of apertures communicating with a receptacle for containing liquid.

19. In a duplicating machine, the combination of a bed plate adapted to support a gelatine band, means for winding the gelatine band to draw the same across the surface of the bed plate, and means for discharging liquid to the under side of the gelatine band when spread upon the bed plate for moistening the band, said means including a trough located beneath the bed plate and having discharging apertures communicating therewith for discharging liquid to the under surface of the gelatine band.

20. In a duplicating machine, the combination of a bed plate adapted to support a gelatine band, means for winding the gelatine band to draw the same across the surface of the bed plate, and means for discharging liquid to the under side of the gelatine band when spread upon the bed plate for moistening the band, said means including a trough located beneath the bed plate and having discharging apertures communicating therewith for discharging liquid to the under surface of the gelatine band, and further including a reservoir adapted to supply liquid to the trough.

21. In a duplicating machine, the combination of a frame provided with a bed plate adapted to support a gelatine band, a carrier adapted to traverse the bed plate, stripping means carried by said carrier and including a pair of stripping rolls in proximate relation to one another, means for rotating said rolls in opposite directions, to strip away a paper sheet from the gelatine band, one of said rolls being grooved, a group of clamping fingers, each being configured to provide an inwardly extending protuberant portion occupying the convergent space between the rolls, and with a portion of its edge entered into the proximate groove in the grooved roll and with a portion of its edge overlying the companion roll to afford a space for the delivery of the paper sheets, each of the fingers terminating in a rearwardly extending tip adapted to clamp the paper sheets delivered rearwardly by the action of the rolls, a rock shaft upon which the clamping fingers are carried, a rack beneath the carrier for receiving the sheets when released therefrom at the point of delivery, and means for actuating the rock shaft to lift the tips of the fingers to release paper sheets at the point of delivery.

22. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned and configured to maintain continuous feeding contact with the leading edge of a paper sheet when projected inwardly from the platform, and means actuated by the movement of the carrier for intermittently rotating the feed roll to advance a paper sheet to the bed plate prior to the arrival of the presser member.

23. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned below the plane of the platform and configured to maintain continuous underlying feeding contact with the leading edge of a paper sheet when projected inwardly from the platform, and means actuated by the movement of the carrier for intermittently rotating the feed roll to advance a paper sheet to the bed plate prior to the arrival of the presser member.

24. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned and configured to maintain continuous feeding contact with the leading edge of a paper sheet when projected inwardly from the platform, means actuated by the movement of the carrier for intermittently rotating the feed roll to advance a paper sheet to the bed plate prior to the arrival of the presser member, and a row of fingers presenting their tips toward the feed roll and adapted in conjunction therewith to position the edge of the paper sheet in position to be fed forwardly by the rotation of the feed roll.

25. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned below the plane of the platform and configured to maintain continuous underlying feeding contact with the leading edge of a paper sheet when projected inwardly from the platform, means actuated by the movement of the carrier for intermittently rotating the feed roll to advance a paper sheet to the bed plate prior to the arrival of the presser member, and a row of fingers presenting their tips toward the feed roll and adapted in conjunction therewith to position the edge of the paper sheet in position to be fed forwardly by the rotation of the feed roll.

26. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned and configured to maintain continuous feeding contact with the leading edge of a paper sheet when projected inwardly from the platform, means actuated by the movement of the carrier for intermittently rotating the feed roll to advance a paper sheet to the bed plate prior to the arrival of the presser member, a row of fingers presenting their tips toward the feed roll and adapted in conjunction therewith to position the edge of the paper sheet in position to be fed forwardly by the rotation of the feed roll, and guide members intermediate the feed roll and the bed plate and mounted in position to underlie and guide the leading edge of the paper when fed inwardly by the feed roll.

27. In a duplicating machine, the combination of a frame provided with a forwardly extending platform adapted to support a stack of paper sheets and with a bed plate adapted to support a gelatine band, a carrier adapted to traverse the bed plate, a presser member carried by said carrier and adapted to spread a paper sheet evenly upon the surface of the gelatine band, a feed roll in adjacent relation to the bed plate, positioned below the plane of the platform and configured to maintain continuous underlying feeding contact with the leading edge of a paper sheet when projected inwardly from the platform, means actuated by the movement of the carrier for intermittently rotating the feed roll to advance a paper sheet to the bed plate prior to the arrival of the presser member, a row of fingers presenting their tips toward the feed roll and adapted in conjunction therewith to position the edge of the paper sheet in position to be fed forwardly by the rotation of the feed roll, and guide members intermediate the feed roll and the bed plate and mounted in position to underlie and guide the leading edge of the paper when fed inwardly by the feed roll.

GEORGE SABIK.
SAMUEL OFFER.